(12) United States Patent
Fujioka et al.

(10) Patent No.: US 8,120,474 B2
(45) Date of Patent: Feb. 21, 2012

(54) COMMUNICATION SYSTEM FOR VEHICLE

(75) Inventors: Eiji Fujioka, Kariya (JP); Manabu Kato, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/214,647

(22) Filed: Aug. 22, 2011

(65) Prior Publication Data
US 2011/0298600 A1 Dec. 8, 2011

Related U.S. Application Data

(63) Continuation of application No. 12/146,878, filed on Jun. 26, 2008.

(30) Foreign Application Priority Data

Jul. 5, 2007 (JP) .................................. 2007-177672

(51) Int. Cl.
*B60R 25/10* (2006.01)
(52) U.S. Cl. .............. 340/426.36; 340/442; 340/426.13; 340/426.28; 340/426.33
(58) Field of Classification Search ............... 340/426.36
See application file for complete search history.

(56) References Cited

U.S. PATENT DOCUMENTS

| | | | |
|---|---|---|---|
| 6,597,284 B2 | 7/2003 | Juzswik | |
| 6,967,570 B2 | 11/2005 | Tsuji et al. | |
| 7,113,083 B2 | 9/2006 | Suitsu | |
| 7,202,777 B2 | 4/2007 | Tsuji et al. | |
| 2001/0010489 A1* | 8/2001 | Baudard | 340/5.72 |
| 2004/0075532 A1* | 4/2004 | Ueda et al. | 340/5.72 |
| 2004/0100360 A1* | 5/2004 | Chandebois | 340/5.72 |
| 2005/0162259 A1 | 7/2005 | Hotta et al. | |
| 2006/0087404 A1 | 4/2006 | Iijima | |
| 2006/0164210 A1 | 7/2006 | Ikeo | |
| 2007/0090919 A1 | 4/2007 | Desai et al. | |
| 2007/0115095 A1 | 5/2007 | Eguchi | |
| 2007/0164876 A1 | 7/2007 | Ostrander et al. | |

FOREIGN PATENT DOCUMENTS

JP 3636184 B 4/2005

* cited by examiner

*Primary Examiner* — George Bugg
*Assistant Examiner* — Kerri McNally
(74) *Attorney, Agent, or Firm* — Buchanan Ingersoll & Rooney PC

(57) ABSTRACT

A communication system for a vehicle includes a portable identification device including a portion for receiving an interrogation signal and a portion for transmitting an indication indicative signal responsive to the interrogation signal, multiple tire sensor devices each of which includes a portion for receiving an initiation signal and a portion for transmitting a condition indicative signal responsive to the initiation signal, multiple transmitting devices each of which emits the interrogation signal and the initiation signal for different conditions within a communication area, a receiving device for receiving the indication indicative signal and the condition indicative signal, and a central controller for unlocking a door lock device when the portable identification device is determined to be in an overlapped area based on a condition of the portable identification device, the overlapped area being defined between two adjacent communication areas and in which the door lock device is involved.

14 Claims, 8 Drawing Sheets

COMMUNICATION SYSTEM FOR VEHICLE

CROSS REFERENCE TO RELATED APPLICATIONS

This application is a continuation of application Ser. No. 12/146,878 filed Jun. 26, 2008, which claims priority under 35 U.S.C. §119 to Japanese Patent Application No. 2007-177672, filed on Jul. 5, 2007, the entire content of which is incorporated herein by reference.

FIELD OF THE INVENTION

This invention generally relates to a communication system for a vehicle.

BACKGROUND

Various vehicles are equipped with smart control systems. Such smart control system performs locking and unlocking of a vehicle door through a verification of an identification (ID) of an electronic key (i.e., portable identification device). That is, a request signal is transmitted from a transmitter provided at a vehicle to the electronic key, and, in response to the request signal, a return signal is transmitted from the electronic key to the vehicle. The smart control system is convenient because the vehicle door is automatically unlocked when a user carrying the electronic key approaches the vehicle door.

Besides the smart control system, various systems such as a tire pressure monitoring system are mounted to a vehicle so as to enhance convenience and safety of a passenger of the vehicle. The tire pressure monitoring system includes air pressure sensors provided at respective tires and each including transmitting and receiving function. Then, on the basis of measurement information (i.e., detection result of the air pressure sensor) sent by each of the air pressure sensors and received by a receiver provided at the vehicle, the tire pressure monitoring system detects an abnormality of any tires and indicates a warning at an indicator.

In cases where various systems are mounted to the vehicle, some system components are desirably shared between the systems so that the number of parts as a whole vehicle is reduced, which leads to low cost systems. JP3636184B discloses a system in which transmitters are shared between the smart control system and the tire pressure monitoring system.

In order to monitor the tire pressure, it is generally required to identify from which air pressure sensor, specifically, tire, of the vehicle the measurement information is sent. Such identification of the measurement information is achieved by preliminary correlating positions of the tires in the vehicle to identifications (IDs) assigned to the air pressure sensors provided at the respective tires. At this time, transmitters for sending ID transmission request signals to the respective air pressure sensors are required so that the ID is transmitted from each of the air pressure sensors. According to the system disclosed in JP3636184B, transmitters designated to the smart control system are also used for sending the ID transmission request signals in the tire pressure monitoring system. Each of the transmitters for the smart control system has a transmission area that includes only one tire provided in the vicinity of each door of the vehicle. For example, the ID transmitted from the transmitter having the transmission area including the right front tire can relate to the right front tire.

Upon consideration of sharing system components between the systems, on the contrary to the case described in JP3636184B, transmitters designated to the tire pressure monitoring system to transmit the ID transmission request signals to the respective air pressure sensors may be used for the smart control system. However, the transmission areas of the transmitters, each specified to include only one tire to identify the positions of the tires in the vehicle, are not appropriate and not sufficient for locking and unlocking the vehicle doors with the smart control system.

Accordingly, it may be considered to expand the transmission area as large as possible while including only one tire. However, an unlocking allowable area by the electronic key is also enlarged, which is undesirable in view of safety concerns.

Such problem is not limited to a case where the transmitters for the tire pressure monitoring system are used for the smart control system and may occur when a mounted position of each of the transmitters for the smart control system has restrictions.

A need thus exists for a communication system for a vehicle which is not susceptible to the drawback mentioned above.

SUMMARY OF THE INVENTION

According to an aspect of the present invention, a communication system for a vehicle includes a portable identification device allowing keyless entry into the vehicle, including a portion for receiving an interrogation signal and a portion for transmitting an indication indicative signal responsive to the interrogation signal, multiple tire sensor devices, each of the tire sensor devices serving for providing information regarding a condition at a tire of the vehicle, each of the tire sensor devices including a portion for receiving an initiation signal and a portion for transmitting a condition indicative signal responsive to the initiation signal, multiple transmitting devices provided adjacent to the respective tire sensor devices, each of the transmitting devices emitting the interrogation signal and the initiation signal for different conditions within a communication area, a receiving device for receiving the indication indicative signal from the portable identification device and the condition indicative signal from each of the tire sensor devices, and a central controller for unlocking a door lock device when the portable identification device is determined to be in an overlapped area based on a condition of the portable identification device, the overlapped area being defined between two adjacent communication areas and in which the door lock device is involved.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained with reference to the attached drawings.

Figure 1:
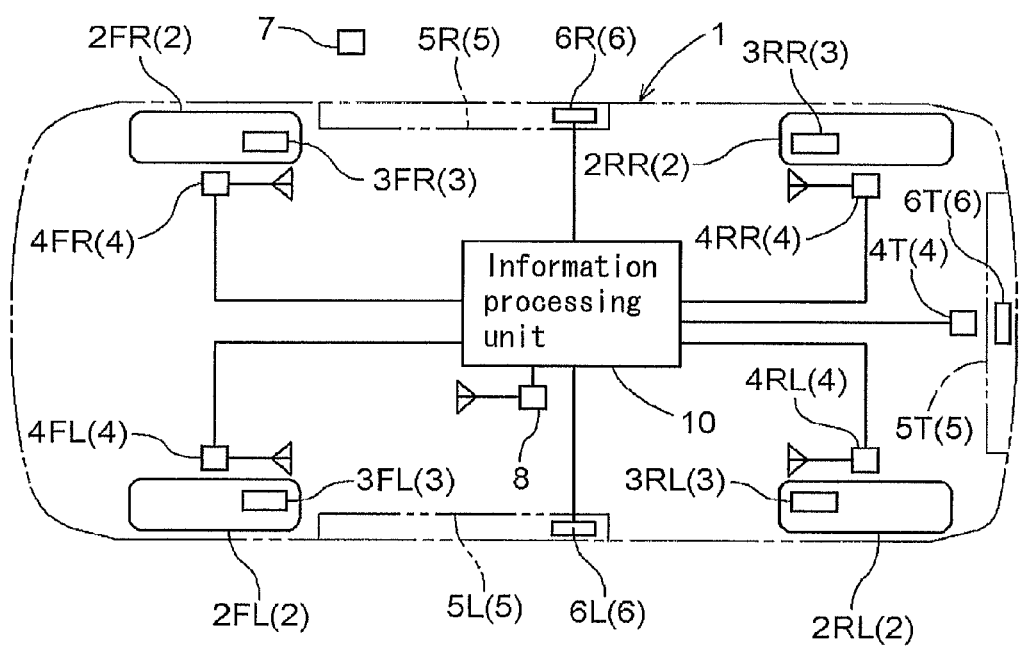
FIG. 1 is a diagram illustrating an overall structure of a vehicle equipped with a communication system according to an embodiment of the prevent invention.

FIG. 1 is a diagram illustrating an overall structure of a vehicle equipped with a smart control system serving as a communication system for a vehicle according to the present embodiment. A vehicle 1 illustrated in FIG. 1 is also equipped with a tire monitoring system also serving as the communication system for a vehicle according to the present embodiment in addition to the smart control system.

Tire sensor devices 3FR, 3RR, 3FL, and 3RL are provided inside tires 2FR, 2RR, 2FL, and 2RL, respectively, for the purpose of measuring tire pressures thereof. Each of the tire sensor devices 3FR, 3RR, 3FL, and 3RL (each of which will be hereinafter comprehensively referred to as a tire sensor device 3) includes transmitting and receiving functions so as to enable a transmission of measurement information (i.e., detection result of the tire sensor device 3) such as a tire pressure and a reception of a seizing signal (i.e., initiation signal) to be explained later. Transmitters 4FR, 4RR, 4FL, and 4RL (each of which will be hereinafter comprehensively referred to as a transmitter 4), each serving as a transmitter device, are provided in the vicinity of the tires 2FR, 2RR, 2FL, and 2RL (each of which will be hereinafter comprehensively referred to as a tire 2), respectively, for the purpose of transmitting the seizing signals to the corresponding tire sensor devices 3 provided at the tires 2. The transmitters 4FR, 4RR, 4FL, and 4RL are not only used for the tire monitoring system by transmitting the seizing signals to the tire sensor devices 3 but also used for the smart control system that remotely controls locking and unlocking of each door of the vehicle 1. A transmitter 4T (which will be hereinafter referred to as a transmitter 4) serving as a transmitting device is also provided in the vicinity of a trunk 5T at a rear portion of the vehicle 1.

Door lock devices 6R, 6L, and 6T (each of which will be hereinafter comprehensively referred to as a door lock device 6) are provided at right and left doors 5R and 5L, and the trunk 5T (each of which will be hereinafter comprehensively referred to as a door 5) of the vehicle 1, respectively. The door lock devices 6, the transmitters 4, and the like are controlled by an information processing unit 10 serving as a central controller, which is constituted so as to accomplish the smart control and the tire monitoring. Therefore, a receiver 8 serving as a receiving device including a receiving antenna is connected to the information processing unit 10 for receiving a return signal (i.e., indication indicative signal) from a portable identification device 7 (hereinafter simply referred to as "a portable device 7"), a signal related to the measurement information from the tire sensor device 3, and the like via the receiving antenna.

In the case of the smart control, a request signal (i.e., interrogation signal) is transmitted from each of the transmitters 4 via a transmitting antenna thereof to the portable device 7. The portable device 7 then transmits a return signal in response to the request signal received. Consequently, the door lock device 6 is controlled in response to the return signal sent from the receiver 8. In the case of the tire monitoring, in order to correlate the position of each of the tires 2 in the vehicle 1 (i.e., left-front, right-front, left-rear, or right-rear) to an identification (ID) assigned to each of the tire sensor devices 3 provided at the tires 2, the seizing signal is transmitted from the transmitting antenna of the designated transmitter 4. The tire sensor device 3 that has received the seizing signal transmits its own ID, which is then received by the receiver 8. As a result, the ID received by the receiver 8 is correlated to the tire 2 in the vicinity of the designated transmitter 4.

Figure 2:
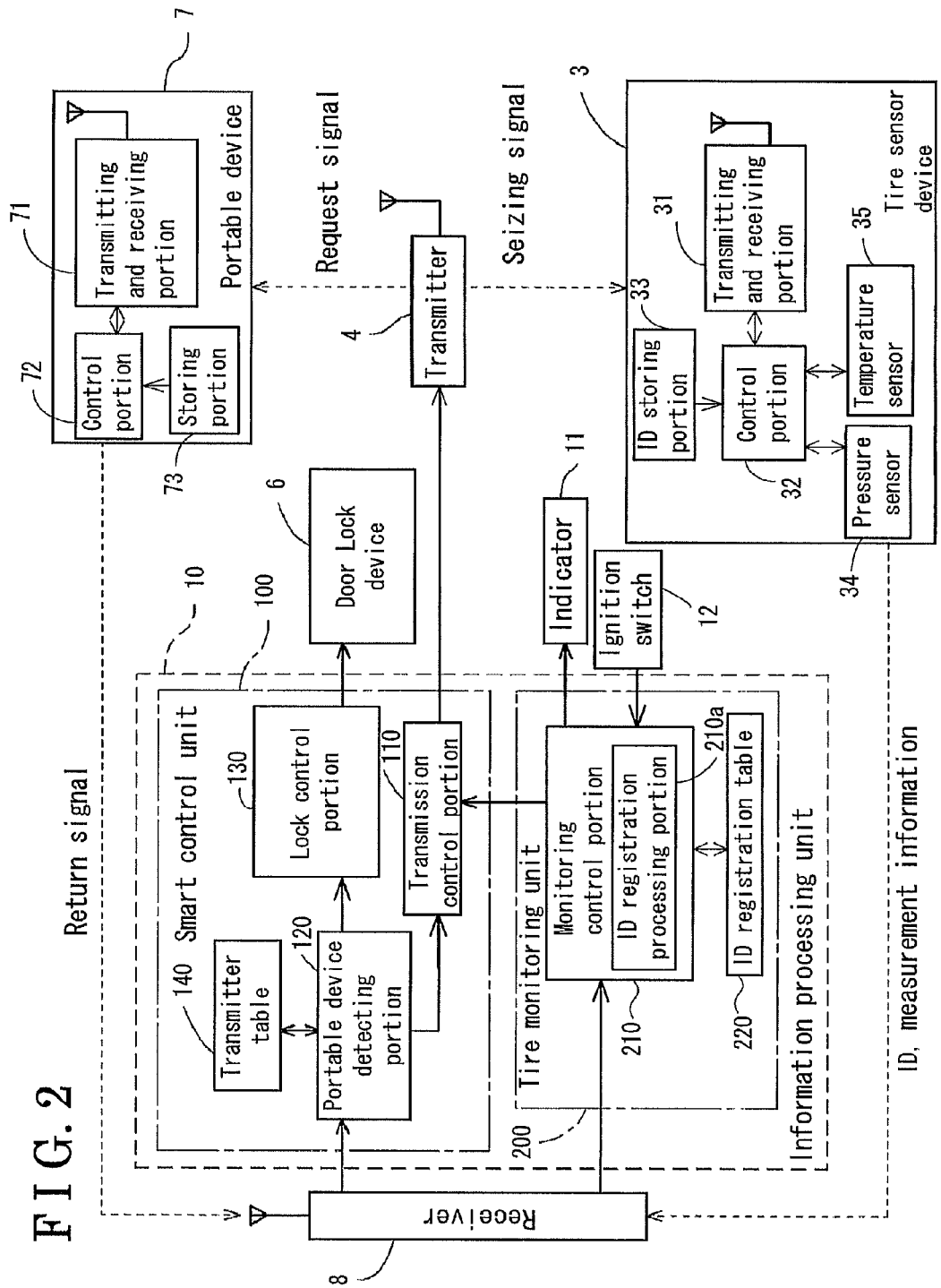
FIG. 2 is a functional block diagram of a smart control system and a tire monitoring system according to the embodiment of the present invention.

FIG. 2 is a functional block diagram illustrating a functional portion specifically related to the smart control system and the tire monitoring system mounted to the vehicle 1 according to the present embodiment. The functional portion, which includes a central processing unit (CPU) as a main member, is constituted by hardware and/or software. As mentioned above, the multiple tire sensor devices 3, transmitters 4, and door lock device 6 are mounted to the vehicle 1. However, each of the components, for example, each of the tire sensor devices 3, has the same structure. Thus, one of the tire sensor devices 3, one of the transmitters 4, and one of the door lock devices 6 will be explained and the others will be omitted below for a simple explanation.

The information processing unit 10 is constituted by a smart control unit 100 and a tire monitoring unit 200. The smart control unit 100 includes a transmission control portion 110, a portable device detecting portion 120, a lock control portion 130, and the like. The transmission control portion 110 controls a signal transmitted by the transmitter 4. The portable device detecting portion 120 commands the transmission control portion 110 to transmit the request signal and detects the presence of the portable device 7 by receiving a received signal from the receiver 8. The lock control portion 130 controls the door lock device 6.

The multiple transmitters 4 provided at the vehicle 1 constitute transmitter groups G1 to G3. Specifically, the transmitter groups G1 to G3 are formed by predetermined combinations of the transmitters 4. Transmission allowable areas within which the request signals are transmittable by the respective transmitters 4 that belong to the same transmitter group, i.e., the transmitter group G1, G2, or G3, are configured to partially overlap each other. Information regarding the combinations of the transmitters 4 forming the transmitter groups G1 to G3 is stored in a transmitter table 140. According to the present embodiment, the transmitter group G1, i.e., front-side transmitter group G1, is constituted by the transmitters 4FR and 4RR. The transmitter group G2, i.e., left-side transmitter group G2, is constituted by the transmitters 4FL and 4RL. The transmitter group G3, i.e., rear transmitter group G3, is constituted by the transmitter 4T.

Figure 3A:
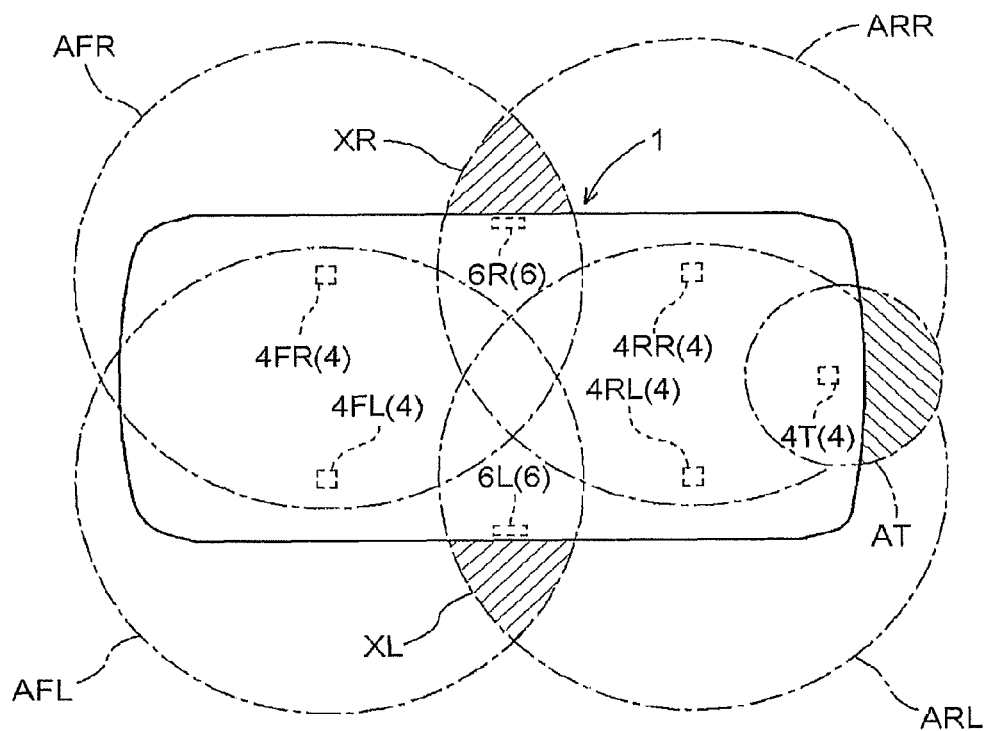
FIGS. 3A and 3B are diagrams each illustrating a transmission allowable area of a transmitter according to the embodiment of the present invention.

FIG. 3A illustrates the transmission allowable areas within which the request signals are transmittable by the respective transmitters 4. An area AFR is the transmission allowable area for the transmitter 4FR. An area ARR is the transmission allowable area for the transmitter 4RR. An area AFL is the transmission allowable area for the transmitter 4FL. An area ARL is the transmission allowable area for the transmitter 4RL. An area AT is the transmission allowable area for the transmitter 4T. The portable device 7 is able to detect the request signal within each of the transmission allowable areas. That is, each of the transmission allowable areas is equal to a communication allowable area. The transmission allowable areas AFR and ARR for the transmitters 4FR and 4RR that belong to the transmitter group G1 partially overlap each other to thereby form an overlap area XR. In addition, the transmission allowable areas AFL and ARL for the transmitters 4FL and 4RL that belong to the transmitter group G2 partially overlap each other to thereby form an overlap area XL.

According to the present embodiment, in cases where a driver, or the like, carrying the portable device 7 approaches the vehicle 1 in the door locked state and it is determined that the portable device 7 is positioned within one of the overlap areas XR, XL, and an area AT (shown as a shaded portion outside the vehicle 1 in FIG. 3A), the door 5 is unlocked by means of the door lock device 6. Specifically, when the portable device detecting portion 120 causes the transmitter 4 to transmit the request signal via the transmission control portion 110, the return signal is sent from the portable device 7 in response to the request signal transmitted by the transmitter 4 only when the portable device 7 is within one of the transmission allowable areas. Then, when it is determined that the portable device 7 is within one of the areas XR, XL, and AT based on the received signal from the receiver 8 that has received the return signal from the portable device 7, the lock control portion 130 commands the door lock device 6 to unlock the door 5. The door 5 is unlocked accordingly. The determination of the portable device 7 positioned within one of the areas XR, XL, and AT will be explained later. The areas XR, XL, and AT (i.e., door locking and unlocking allowable areas) are each desirably defined within a range of 70 cm from each door handle (not shown).

The portable device 7 includes a transmitting and receiving portion 71, a control portion 72, a storing portion 73, and the like. The transmitting and receiving portion 71 receives the request signal from the transmitter 4 and transmits the return signal to the receiver 8. The control portion 72 analyzes the request signal from the receiver 8 and controls the return signal to be sent. The storing portion 73 stores an identification (ID) of the portable device 7 and information related to the transmitter groups G1 to G3 same as that stored in the transmitter table 140. The storing portion 73 also stores information related to the request signals so as to identify which transmitter 4 the request signal is transmitted from. This identification may be possible by various methods such as by differentiating frequencies of the request signals sent from the respective transmitters 4, by attaching an ID of each of the transmitters 4 to the request signal, and the like.

The tire monitoring unit 200 includes a monitoring control portion 210 having an identification (ID) registration processing portion 210a by means of which the position of each of the tires 2 in the vehicle and the ID assigned to each of the tire sensor devices 3 are correlated to each other. According to the ID registration process, for example, the ID of the tire sensor device 3FR is transmitted therefrom so that the ID registration processing portion 210a registers the received ID as being related to the right front tire 2FR. Details of the ID registration process will be explained later. The seizing signal for requesting the tire sensor device 3 to send its ID is transmitted by each of the transmitters 4. That is, the transmitters 4 are shared between the smart control system and the tire monitoring system. In cases where the monitoring control portion 210 commands the transmission control portion 110 to send the seizing signal to the tire sensor device 3, the transmission of the request signal is stopped and then the transmission of the seizing signal is started.

Figure 3B:
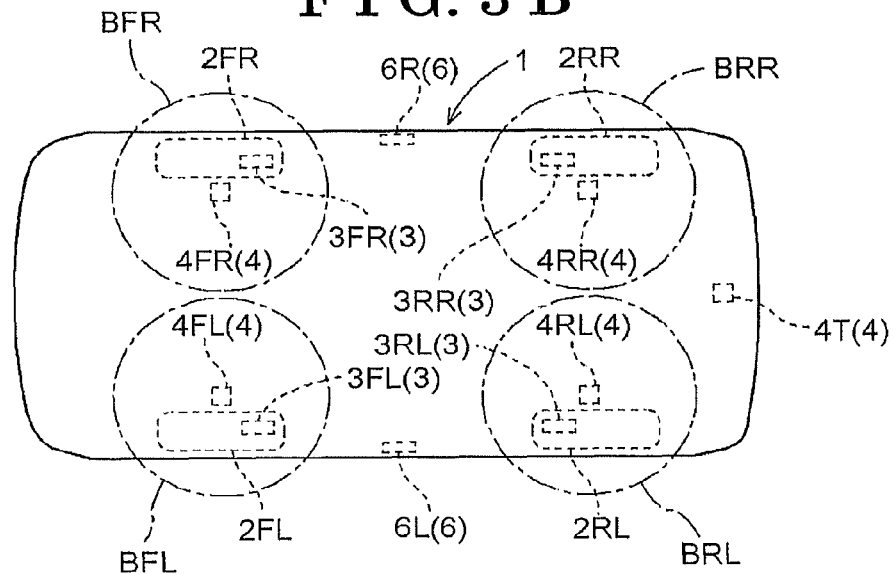

According to the present embodiment, a transmission output (i.e., transmission allowable area) of the transmitter 4 is different between cases when the request signal is transmitted by the smart control system and when the seizing signal is transmitted by the tire monitoring system. As illustrated in FIG. 3B, the transmission output is lower, i.e., the transmission allowable area is smaller, when the seizing signal is transmitted by the tire monitoring system than when the request signal is transmitted by the smart control system. Transmission allowable areas BFR, BRR, BFL, and BRL within which the seizing signals are transmittable from the respective transmitters 4FR, 4RR, 4FL, and 4RL are defined in such a manner that each of the areas BFR, BRR, BFL, and BRL includes only one tire sensor device 3. The switching of the transmission output, i.e., the switching between the large transmission allowable area and the small transmission allowable area is performed at the transmission control portion 110. According to the present embodiment, the transmitter 4T does not transmit the seizing signal.

A result of correlation between the position of each of the tires 2 in the vehicle and the ID assigned to each of the tire sensor devices 3 is registered at the ID registration table 220. After the registration, the tire monitoring is performed by referring to the ID registration table 220 to identify which tire the measurement information is related to, on the basis of the ID attached to the measurement information sent from the tire sensor device 3. The aforementioned process is started by an operation of an ignition switch 12. The measurement information sent from the tire sensor device 3 is displayed on an indicator 11.

The tire sensor device 3 includes a transmitting and receiving portion 31, a control portion 32, an ID storing portion 33, and the like. The transmitting and receiving portion 31 receives the seizing signal and transmits the ID, measurement information to which the ID is attached, and the like (i.e., transmits a condition indicative signal). The control portion 32 analyzes the received seizing signal, controls a transmission of the measurement information to the receiver 8, and the like. The ID storing portion 33 stores an own ID. The tire sensor device 3 also includes a pressure sensor 34 for detecting an air pressure in the tire 2 and a temperature sensor 35 for detecting a temperature in the tire 2. The pressure and temperature detected by the pressure sensor 34 and the temperature sensor 35 are acquired by the control portion 32 as the measurement information and are transmitted to the tire monitoring unit 200 via the receiver 8.

Next, a flow of an unlocking control process according to the present embodiment will be explained with reference to FIG. 4. According to the present embodiment, the portable device 7 is configured to transmit the return signal to the receiver 8 in cases where the portable device 7 receives the request signal from the transmitter 4 and further receives the request signal from the other transmitter 4 in the same transmitter group. At the vehicle, when it is determined that the portable device 7 is positioned within one of the areas XR, XL, and AT based on the return signal sent from the portable device 7, the door 5 is unlocked by means of the door lock device 6. This is because, as long as the portable device 7 receives both the request signals within a predetermined time in the area XR, for example, where the request signals are transmittable from the transmitters 4FR and 4RR, respectively, both of which belong to the transmitter group G1, it is assumed that the portable device 7 is positioned within the area XR even if a driver and the like carrying the portable device 7 is moving.

Figure 4:
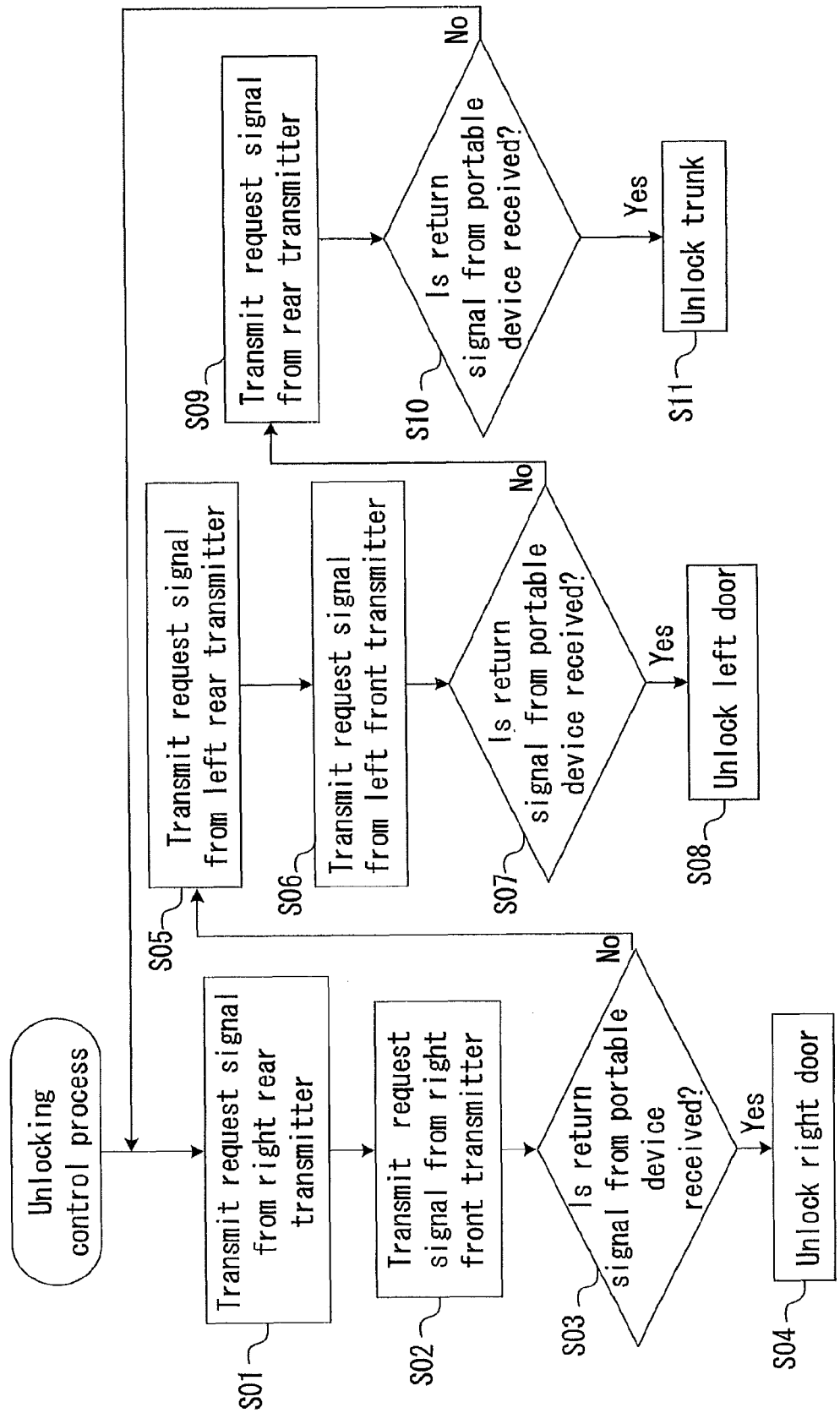
FIG. 4 is a flowchart of an unlocking control process according to the embodiment of the present invention.

As illustrated in FIG. 4, first, the request signal is transmitted from the right rear transmitter 4RR in S01. After a predetermined time (for example, after 0.1 second), the request signal is then transmitted from the right front transmitter 4FR in S02. In cases where the return signal from the portable device 7 is received by the receiver 8 (i.e., positive determination is made in S03), the right door 5R is unlocked in S04 as it is determined that the portable device 7 is positioned within the area XR. A process for transmitting the return signal performed by the portable device 7 will be explained later. The return signal from the portable device 7 includes its own ID. Then, when it is verified that the return signal is transmitted from the portable device 7 that relates to the vehicle 1, the door 5 is unlocked.

In cases where the return signal from the portable device 7 is not received (i.e., negative determination is made in S03), the request signal is transmitted from the left rear transmitter 4RL in S05. After the predetermined time has elapsed, the request signal is then transmitted from the left front transmitter 4FL in S06. In cases where the return signal from the portable device 7 is received (i.e., positive determination is made in S07), the left door 5L is unlocked in S08 as it is determined that the portable device 7 is positioned within the area XL.

In cases where the return signal from the portable device 7 is not received (i.e., negative determination is made in S07), the request signal is then transmitted from the rear transmitter 4T in S09. Then, when the return signal from the portable device 7 is received (i.e., positive determination is made in S10), the trunk 5T is unlocked in S11. When the return signal from the portable device 7 is not received (i.e., negative determination is made in S10), the process returns to S01 so as to repeat the same routine until the return signal from the portable device 7 is received, i.e., until any one of the vehicle doors 5 is unlocked.

The transmission of the request signal from each of the transmitters 4 is controlled by the portable device detecting portion 120 of the smart control unit 100 that commands the transmission control portion 110 to send the request signal. In addition, the unlocking of the door 5 upon reception of the return signal is controlled by the portable device detecting portion 120 that notifies the lock control portion 130 of the detection of the portable device 7. Then, the lock control portion 130 commands the door lock device 6 to unlock the door 5 to thereby unlock the door 5. In the flow illustrated in FIG. 4, an order of the right rear transmitter 4RR and the right front transmitter 4FR, or an order of the left rear transmitter 4RL and the left front transmitter 4FL may be changed. In addition, an order of the right transmitters 4FR and 4RR, the left transmitters 4FL and 4RL, and the rear transmitter 4T may be changed. In this case, the transmitters belonging to the same transmitter group are required to sequentially transmit the request signals, which is achieved by referring to information related to the transmitter groups stored in the transmitter table 140.

Figure 5:
FIG. 5 is a flowchart of a return signal transmission process by a portable device according to the embodiment of the present invention.

Next, a flow of a reception of the request signal and a transmission of the return signal will be explained with reference to FIG. 5. In FIG. 5, a case where the return signal is transmitted in response to processes in S01 and S02 in FIG. 4 will be explained. At this time, the same explanation is also applied to a case where the return signal is transmitted in response to processes in S05 and S06. First, in cases where the request signal transmitted from the right rear transmitter 4RR is received (i.e., positive determination is made in S20), it is then determined whether or not the request signal from the right front transmitter 4FR is received in S21. When the request signal from the right front transmitter 4FR is received (i.e., positive determination is made in S21) and a transmission interval of the request signals transmitted from the transmitters 4RR and 4FR is within a predetermined time (i.e., positive determination is made in S22), the portable device 7 transmits the return signal to the receiver 8 in S23.

On the other hand, in cases where the request signal from the right front transmitter 4FR is not received even though the request signal from the transmitter 4RR is received (i.e., negative determination is made in S21) and the predetermined time has elapsed (i.e., positive determination is made in S24), or the transmission interval of the request signals exceeds the predetermined time even though both the request signals are received (i.e., negative determination is made in S22), the process returns to S20 so as to wait the request signal from the transmitter.

The aforementioned process is performed at the control portion 72 of the portable device 7. In particular, the distinction of which transmitter the received request signal is transmitted from and the determination of which transmitter group the identified transmitter belongs to are conducted by referring to the storing portion 73. When the received request signal is transmitted from the right rear transmitter 4RR, the aforementioned process illustrated in FIG. 5 is performed. When the received request signal is transmitted from the left rear transmitter 4RL, the aforementioned process illustrated in FIG. 5 is also performed. When the received request signal is transmitted from the rear transmitter 4T, the return signal is simply returned.

The vehicle 1 is equipped with the tire monitoring system in addition to the smart control system as mentioned above. In the followings, a flow of an ID registration process and a monitoring process will be explained.

Figure 6:
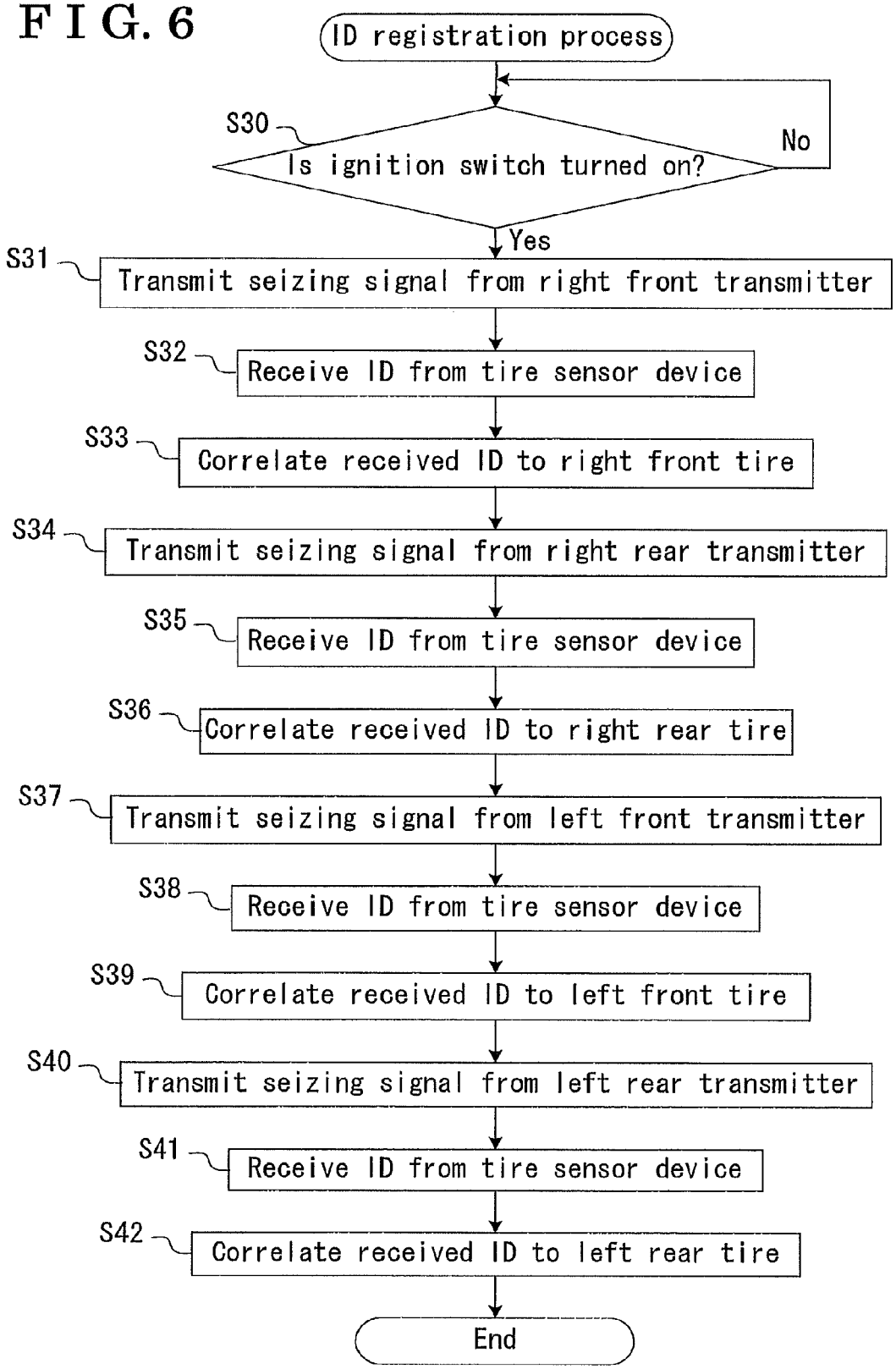
FIG. 6 is a flowchart of an ID registration process according to the embodiment of the present invention.

According to the present embodiment, the transmission of the request signal is stopped when the ignition switch 12 is turned on. Then, the transmission of the seizing signal from each of the transmitters 4FR, 4RR, 4RR, 4FL, and 4RL is started. As illustrated in FIG. 3B, each of the transmission allowable areas for the transmitters 4 within which the seizing signal is transmittable includes only one tire sensor device 3. Accordingly, the position of the tire 2 in the vehicle 1 and the tire sensor device 3 provided at the tire 2 are easily correlated to each other. In the followings, the ID registration process according to the present embodiment will be explained with reference to FIG. 6. This process is performed one time after the ignition switch 12 is turned on.

In cases where it is detected that the ignition switch 12 is turned on (i.e., positive determination is made in S30), the ID registration processing portion 210a causes the right front transmitter 4FR to transmit the seizing signal in S31. When the tire sensor device 3FR receives the seizing signal, the tire sensor device 3FR reads out and receives the ID from the ID storing portion 33. This ID is transmitted to and received by the receiver 8 in S32. The ID registration processing portion 210a specifies the received ID as being related to the right front tire 2 and stores this information into the ID registration table 220 in S33. The same ID registration process is also performed on the position of the right rear tire, the position of the left front tire, and the position of the left rear tire in S34 to S36, in S37 to 39, and in S40 to S42. The positions of the tires and the IDs of the tire sensor devices 3 provided at the tires are correlated to each other, accordingly.

Figure 7:
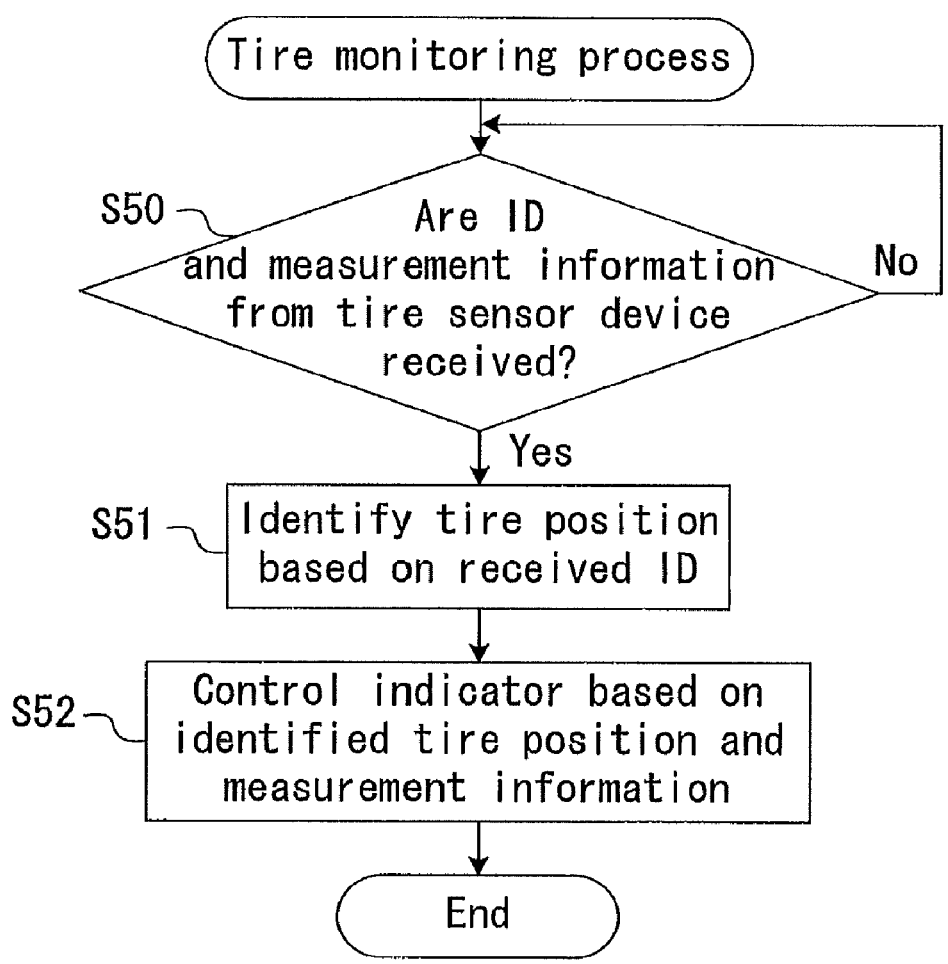
FIG. 7 is a flowchart of a tire monitoring process according to the embodiment of the present invention.

A tire monitoring process while the vehicle is driven will be explained with reference to FIG. 7. The tire sensor device 3 according to the present embodiment automatically transmits the measurement information at a predetermined time interval. In this case, the ID of the corresponding tire sensor device 3 is attached to the measurement information. In cases where the receiver 8 receives the measurement information and the ID attached thereto from the tire sensor device 3 (i.e., positive determination is made in S50), the monitoring control portion 210 refers the ID registration table 220 so as to identify the position of the tire related to the ID received in S51. When the position of the tire is identified, the indicator 11 is controlled on the basis of the tire at the identified position and the measurement information in S52. As a result, a driver is notified the measurement information of the tire at the identified position. The transmission of the measurement information may be conducted in response to a transmission instruction signal from the transmitter 4, instead of being automatically performed by the tire sensor device 3.

The tire monitoring process is terminated when the ignition switch 12 is turned off. Afterwards, the request signal is transmitted from the transmitter 4 again for starting the smart control with the transmission allowable areas XR, XL, and AT serving as the door locking and unlocking allowable areas for the portable device 7. That is, according to the present embodiment, operations of the smart control and the tire monitoring system are switched therebetween depending on an on and off of the ignition switch 12.

Figure 8:
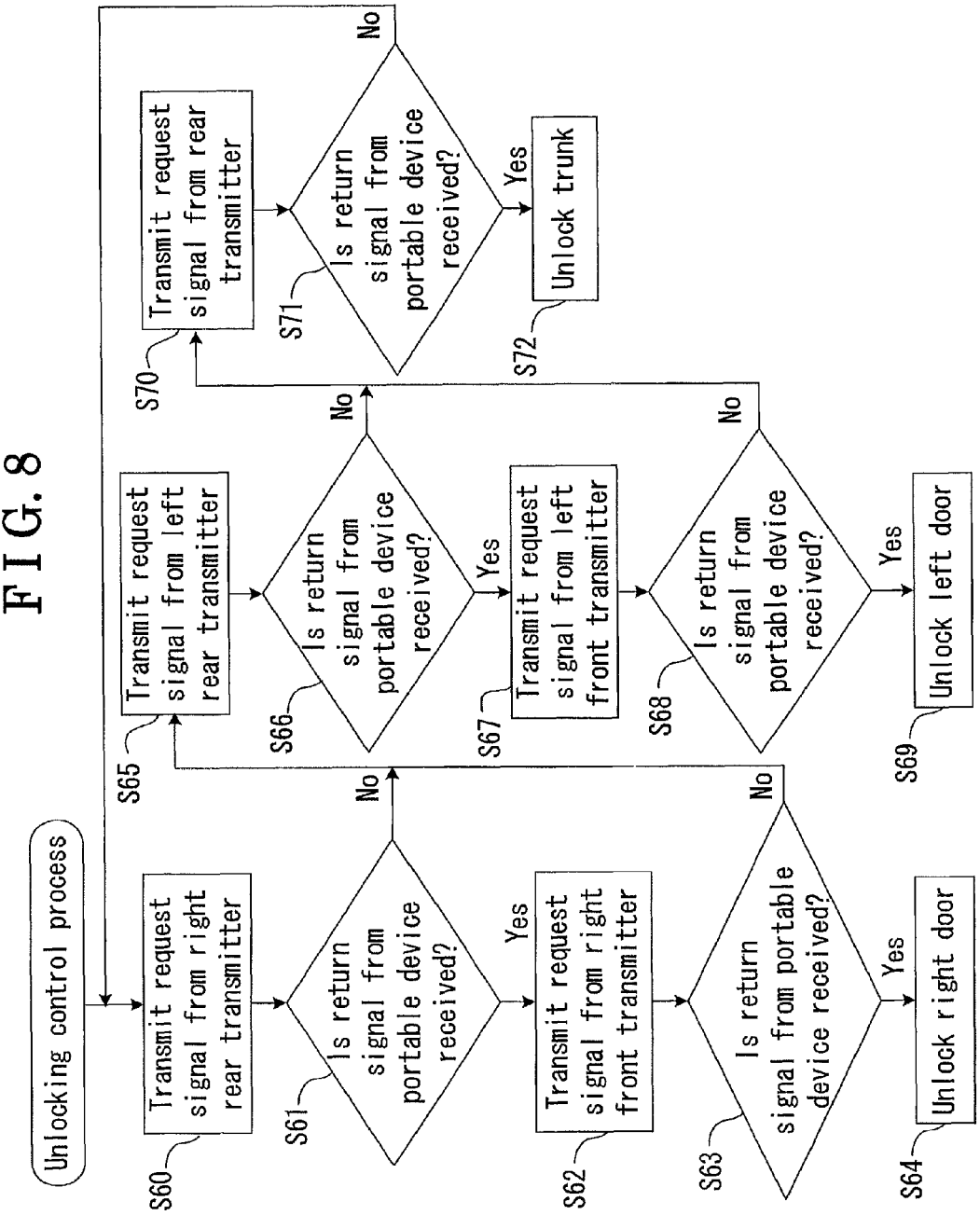
FIG. 8 is a flowchart of an unlocking control process according to another embodiment of the present invention.

As illustrated in FIG. 8, another embodiment may be employed for the unlocking control process. According to another embodiment, the portable device 7 is so configured to transmit the return signal each time the portable device 7 receives the request signal.

First, the request signal is transmitted from the right rear transmitter 4RR in S60. When the return signal from the portable device 7 is received (i.e., positive determination is made in S61), the request signal is then transmitted from the right front transmitter 4FR in S62. The transmission interval of the request signals by the transmitters 4 is, for example, 0.1 second. In cases where the return signal from the portable device 7 is received (i.e., positive determination is made in S63), the right door 5R is unlocked in S64 as it is determined that the portable device 7 is positioned within the area XR.

At this time, when the return signal from the portable device 7 is not received (i.e., negative determination is made in S63), the request signal is then transmitted from the left rear transmitter 4RL in S65. When the return signal from the portable device 7 is received (i.e., positive determination is made in S66), the request signal is then transmitted from the left front transmitter 4FL in S67. When the return signal from the portable device 7 is received (i.e., positive determination is made in S68), the left door 5L is unlocked in S69 as it is determined that the portable device 7 is positioned within the area XL.

When the return signal from the portable device 7 is not received (i.e., negative determination is made in S68), the request signal is then transmitted from the rear transmitter 4T in S70. In cases where the return signal from the portable device 7 is received (i.e., positive determination is made in S71), the trunk 5T is unlocked in S71. At this time, when the return signal from the portable device 7 is not received (i.e., negative determination is made in S71), the process returns to S60 so that the same routine is repeated until the return signal from the portable device 7 is received, i.e., any one of the doors 5 is unlocked.

In the flow illustrated in FIG. 8 according to another embodiment, an order of the right rear transmitter 4RR and the right front transmitter 4FR, or an order of the left rear transmitter 4RL and the left front transmitter 4FL may be changed. In addition, an order of the right transmitters 4FR and 4RR, the left transmitters 4FL and 4RL, and the rear transmitter 4T may be changed.

According to the aforementioned embodiments, the transmitters 4 are arranged in the vicinity of the respective tires 2. Alternatively, the transmitters 4 may be arranged at portions closer to the doors 5, and the like. An appropriate adjustment of portions where the transmitters 4 are arranged realizes the transmission allowable areas partially overlapping each other and including only one tire sensor device 3 even with the same transmission output level (i.e., same transmission allowable area) between the request signal transmission and the seizing signal transmission, depending on a relationship between the size of the transmission allowable area and a configuration of the vehicle.

Further, according to the aforementioned embodiments, each transmitter group is constituted by two transmitters 4. Alternatively, each transmitter group may be constituted by more than two transmitters. In this case, the door locking and unlocking allowable area for the portable device 7 may be equal to a partially overlapped area of the transmission allowable areas for all the transmitters or at least two transmitters that belong to the same transmitter group.

Furthermore, according to the aforementioned embodiments, the transmitters 4 for the tire monitoring are also used for the smart control. Alternatively, transmitters designated to the other system may be used for the smart control.

Furthermore, according to the aforementioned embodiments, the communication system is adapted to a vehicle. Alternatively, the communication system having a concept that a partially overlapped area of the transmission allowable areas for the multiple transmitters is determined as the door locking and unlocking allowable area for the portable device may be adapted to a front door of a house, for example.

In this case, the communication system for a door includes multiple transmitters, a portable device transmitting a return signal in response to request signals sent from the multiple transmitters, a receiver receiving the return signal from the portable device, and a control portion controlling a locking and unlocking state of the door in response to the return signal received by the receiver.

Then, in the same way as the aforementioned embodiments, transmission allowable areas within which the request signals of the respective transmitters that belong to the same transmitter group are configured to overlap each other. The overlapped area is formed by an appropriate adjustment of the mounting position and the transmission output (i.e., transmission allowable area) of each transmitter. Then, when it is determined that the portable device is positioned within the overlapped area of the transmission allowable areas based on the transmission of the return signal from the portable device, the door is unlocked.

Accordingly, even when the transmitters cannot be arranged, in view of a material around the door, designs, and the like, at portions where the transmitters should be arranged, the transmitters may be arranged at the other portions, and then the overlapped area of the transmission allowable areas is made to be the door locking and unlocking allowable area. The various structures according to the aforementioned embodiments may be applied to the communication system for a door.

According to the aforementioned embodiments, the transmitters 4 for the tire monitoring system are also used for the smart control system. Then, the predetermined combinations of the transmitters 4 constitute the transmitter groups. The transmission allowable areas of the request signals for the transmitters 4 that belong to the same transmitter group partially overlap each other. When it is determined that the portable device 7 is in the overlapped area based on the transmission of the return signal from the portable device 7, the door 5 is unlocked. The unlocked state of the door 5 includes not only the actual unlocked state of the door 5 but also a door unlocking standby state in which the door 5 is unlocked when an operation start of a door handle is detected. That is, the unlocked state is equal to a state where the door 5 is possible to be opened.

Accordingly, the area where the portable device 7 should be positioned for unlocking the door 5 is formed by the partially overlapped area of the transmission allowable areas for the transmitters 4 that belong to the same transmitter group. Thus, even when the transmission allowable area of each transmitter is excessively large, the combination of the transmitters constituting the same transmitter group, the transmission output of each transmitter, and the like are adjusted so that the partially overlapped area is appropriately formed. As a result, the locking and unlocking area of the door 5 by the portable device 7 is appropriately defined.

Various methods are considered for determining that the portable device 7 is positioned within the partially overlapped area of the transmission allowable areas based on the transmission of the return signal from the portable device 7. In particular, within the overlapped area of the transmission allowable areas for the transmitters 4 that belong to the same transmitter group, by focusing on a fact that the request signals are transmitted by the respective transmitters 4 that belong to the same transmitter group, it is determined that the portable device 7 is within the partially overlapped area in cases where the portable device 7 transmits the return signal each time the portable device 7 receives the request signal from each of the transmitters 4 and then the receiver 8 receives the multiple return signals within the predetermined time.

At this time, in order to reduce the power consumption of the portable device 7, the number of transmissions of the return signals is desirably less. Thus, according to one of the embodiments, the portable device 7 is constituted so as to transmit the return signal to the receiver 8 in cases where the portable device 7 receives the request signal from one transmitter and further receives the request signal from the other transmitter, both the transmitters belonging to the same transmitter group. Afterwards, it is determined that the portable device 7 is positioned within the partially overlapped area of the transmission allowable areas.

Further, the transmitters 4 according to the aforementioned embodiments are used among multiple systems. Thus, depending on an intended purpose of each system, the size of the transmission output, i.e., the size of the transmission allowable area of the signal, may be changeable so as to achieve the transmission allowable area appropriate for each system. In particular, in the case of using the transmitters for the tire monitoring system, each of the transmission allowable areas is required only to include the tire sensor device 3. Therefore, each of the transmission allowable areas for the tire monitoring system is smaller than that for the smart control system. Consequently, the transmission output of the transmitter 4 for the tire monitoring system may be changed to be lower when the seizing signal is transmitted to each of the tire sensor devices 3 than when the request signal is transmitted to the portable device 7.

Further, according to one of the embodiments, each of the transmission allowable areas of the respective seizing signals includes only one tire sensor device 3 out of the multiple tire sensor devices 3 so that each position of the tires 2 and the tire sensor device 3 provided at the corresponding tire 2 can be easily correlated to each other.

According to the aforementioned embodiments, the condition of the portable device 7 is that the portable device 7 transmits the return signal within predetermined time duration.

Further, according to the aforementioned embodiments, the adjacent communication areas are reduced to delete the overlapped area therebetween.

Furthermore, according to the aforementioned embodiments, the reduced communication area is defined to include only one tire sensor device.

Furthermore, according to the aforementioned embodiments, the communication system for a vehicle further includes another door lock device 6 located at a rear portion of the vehicle 1, wherein the another door lock device 6 falls in an overlapped area when the two adjacent communication areas are in a width direction of the vehicle 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A communication system for a vehicle, comprising:
a portable identification device allowing keyless entry into the vehicle, including means for receiving an interrogation signal and means for transmitting an indication indicative signal responsive to the interrogation signal;
a plurality of tire sensor devices, each of the tire sensor devices serving for providing information regarding a condition at a tire of the vehicle, each of the tire sensor devices including means for receiving an initiation signal and means for transmitting a condition indicative signal responsive to the initiation signal;
a plurality of transmitting devices provided adjacent to the respective tire sensor devices, each of the transmitting devices emitting the interrogation signal and the initiation signal for different conditions within a communication area;
a receiving device for receiving the indication indicative signal from the portable identification device and the condition indicative signal from each of the tire sensor devices; and
a central controller for unlocking a door lock device only when the portable identification device is determined to be in an overlapped area between two adjacent communication areas based on a condition of the portable identification device.

2. The communication system according to claim 1, wherein the condition of the portable identification device is that the portable identification device transmits the indication indicative signal within predetermined time duration.

3. The communication system according to claim 1, wherein the adjacent communication areas are reduced to delete the overlapped area therebetween when the portable identification device transmits the indication indicative signal.

4. The communication system according to claim 3, wherein each of the reduced communication areas is defined to include only the corresponding tire sensor device.

5. The communication system according to claim 1, further comprising another door lock device located at a rear portion of the vehicle, wherein the another door lock device falls in the overlapped area when the two adjacent communication areas are in a width direction of the vehicle.

6. A communication system for a vehicle, comprising:
a portable identification device allowing keyless entry into the vehicle, including means for receiving an interrogation signal and means for transmitting an indication indicative signal responsive to the interrogation signal;
a plurality of tire sensor devices, each of the tire sensor devices serving for providing information regarding a condition at a tire of the vehicle, each of the tire sensor devices including means for receiving an initiation signal and means for transmitting a condition indicative signal responsive to the initiation signal;

a plurality of transmitting devices provided adjacent to the respective tire sensor devices, each of the transmitting devices emitting the interrogation signal and the initiation signal for different conditions within a communication area;

a receiving device for receiving the indication indicative signal from the portable identification device and the condition indicative signal from each of the tire sensor devices; and a central controller for unlocking a door lock device, the central controller determining whether or not the portable identification device is inside an overlapped area between two adjacent communication areas, wherein, if the central controller determines that the portable identification device is inside the overlapped area, the central controller unlocks the door lock device, and wherein, if the central controller determines that the portable identification device is outside the overlapped area, the central controller maintains the door lock device locked.

7. The communication system according to claim 6, wherein the condition of the portable identification device is that the portable identification device transmits the indication indicative signal within a predetermined time duration.

8. The communication system according to claim 6, wherein the adjacent communication areas are reduced to delete the overlapped area therebetween when the portable identification device transmits the indication indicative signal.

9. The communication system according to claim 8, wherein each of the reduced communication areas is defined to include only the corresponding tire sensor device.

10. The communication system according to claim 6, further comprising another door lock device located at a rear portion of the vehicle, wherein the another door lock device falls in the overlapped area when the two adjacent communication areas are in a width direction of the vehicle.

11. A communication system for a vehicle, comprising:

a first transmitting device emitting a first interrogation signal within a first transmission area;

a second transmitting device emitting a second interrogation signal within a second transmission allowable area which partially overlaps with the first transmission area to form an overlap area;

a portable device receiving each of the first and second interrogation signals from each of the first and second transmitting devices and transmitting a return signal in response to each of the first and second interrogation signals;

a receiving device receiving the return signal from the portable device; and a controller receiving the return signal from the receiving device and controlling a door lock device in response to the return signal;

wherein the controller determines whether or not the portable device is positioned within the overlap area between the first and second transmission allowable areas, if it is determined that the portable device is positioned within the overlap area, the controller unlocks the door lock device, and if it is determined that the portable device is positioned outside the overlap area, the controller maintains the door lock device locked.

12. The communication system according to claim 11, wherein the condition of the portable device is that the portable device transmits the return signal within a predetermined time duration.

13. The communication system according to claim 11, wherein the first and second transmission allowable areas are reduced to delete the overlap area therebetween when the portable device transmits the return signal.

14. The communication system according to claim 11, further comprising another door lock device located at a rear portion of the vehicle, wherein the another door lock device falls in the overlap area when the first and second transmission allowable areas are in a width direction of the vehicle.

* * * * *